United States Patent [19]

Frankel et al.

[11] 3,954,949

[45] May 4, 1976

[54] PROCESS FOR MAKING OXYGEN DIFLUORIDE

[75] Inventors: Henry Frankel, Raritan; James S. MacKenzie, Parsippany Troy Hills, both of N.J.

[73] Assignee: Allied Chemical Corporation, New York, N.Y.

[22] Filed: May 3, 1962

[21] Appl. No.: 193,649

[52] U.S. Cl. ............................... 423/489; 423/579
[51] Int. Cl.² ......................................... C01B 11/24
[58] Field of Search .............. 23/205; 423/489, 579

[56] References Cited
OTHER PUBLICATIONS

Sicre et al., *Angew. Chem.,* 69, 226 (1957), abstracted in *Chem. Abs.,* 53, Abs. No. 16782c.

Doklay Akad. Nauk, S.S.S.R., 77, 69–72 (1951).

*Primary Examiner*—Edward A. Miller
*Attorney, Agent, or Firm*—Jay P. Friedenson; Ernest A. Polin

EXEMPLARY CLAIM

1. The process for making oxygen difluoride which comprises subjecting alkali metal dioxide in a reaction zone, at temperature substantially in the range of 20°–150° C., to the action of elemental fluorine to effect reaction of fluorine with the alkali metal dioxide to form oxygen difluoride, and recovering oxygen difluoride.

8 Claims, No Drawings

PROCESS FOR MAKING OXYGEN DIFLUORIDE

This invention relates to processes for making oxygen difluoride, $OF_2$, b.p. minus 145°C., a known compound of powerful fluorinating and oxidizing properties.

It has been proposed to make oxygen difluoride by passing elemental fluorine into a 2% aqueous sodium hydroxide solution which holds oxygenated impurities in non-volatile form. Sodium hydroxide concentration must be held constant to effect any appreciable formation of $OF_2$, and must be held low to avoid $OF_2$ decomposition. Further, there is the possibility of an explosive reaction between fluorine and NaOH. It has also been suggested to make oxygen difluoride by reaction of elemental fluorine and perchloric acid flowing over graphite. This method involves formation of small amounts of a chlorine-oxygen-fluorine compound byproduct which is highly unstable and explosive.

An object of this invention is to provide a practicable method for making oxygen difluoride.

In accordance with the invention, it has been found that oxygen difluoride may be made by effecting certain controlled gas phase reactions of elemental fluorine and alkali metal superoxides. Discovery of the feasible reactability of elemental fluorine and superoxides of alkali metals affords operating advantages in that the alkali metal superoxide-elemental fluorine reaction itself may be carried out at temperatures which are only moderately elevated, apparatus required is simple and easily operated, moreover, lowest temperatures needed at any point in the process are of the order of minus 150°–160° C.

The alkali metal superoxides which may be employed include those of sodium, potassium, lithium, cesium and rubidium, usually the superoxides of sodium, $NaO_2$, potassium, $KO_2$, and lithium, $LiO_2$, the $KO_2$ being preferred.

Generally, practice of the invention comprises subjecting the particular alkali metal superoxide starting material, in a suitable reaction zone and at certain herein noted temperatures and preferably in the presence of a small amount of oxide of silver, to the action of elemental fluorine in quantity and for a time sufficient to effect reaction of fluorine with a substantial amount of alkali metal superoxide to form a substantial quantity of oxygen difluoride, and recovering the latter from the gaseous exit of the reaction zone. Elemental fluorine is employed in the usual form as a gas, and the alkali metal dioxide in the usual solid form.

Apparatus utilized is relatively simple and comprises a reactor, adapted to hold the alkali metal starting material and solid reaction products, provided with an inlet for introduction of metered quantities of elemental fluorine and an inert diluting gas if desired, and with a gas outlet. The reactor may be tubular and made of any suitable material such as glass, quartz, nickel, copper and Monel. Preferably, the reactor is equipped with suitable electrical heating means for supplying extraneous heat to the reaction zone if required. The gas outlet of the reactor may be connected to the gas inlet of a cold trap associated with refrigerating facilities to maintain the trap at temperatures suitably below the minus 145°C. boiling point of $OF_2$, e.g. at temperatures in the range of minus 150°–160° C. The trap may be provided with a gas vent to permit, during the reaction phase of a run, passage thru the trap of unreacted fluorine and any inert diluting gas or other material non-condensable under the conditions existing in the trap. The latter may be equipped with other valved outlets thru which, during a reaction run, liquid condensate may be drawn off to a fractionator or, following the reaction run, condensate may be fractionated off to storage or further purification. Apparatus other than the reactor may be made of any suitable material, such as Monel, copper, and nickel, which is corrosive-resistant to the reactants and products involved.

Elemental fluorine as such may be supplied to the reactor. However, because of practical inconveniences of handling fluorine per se, and more importantly to facilitate temperature control of the exothermic reaction between the fluorine and the alkali metal superoxide, it is desirable to charge fluorine as a gas diluted with usually at least an equal volume of inert gas such as nitrogen, helium or argon. Preferably, elemental fluorine is charged as a constituent of a gas containing by volume 20–40% elemental fluorine and 80–60% diluent gas. Apart from temperature control, use of moderately well diluted elemental fluorine facilitates handling, and smoothness of reaction.

Reaction of fluorine with alkali metal superoxide, in all modifications of practice of the invention may be carried out over a relatively broad, but at the same time relatively low level temperature range. The fluorine-superoxide reaction is notably exothermic. At atmospheric pressure, reaction thresholds at about room temperature, i.e. at about 20° C. Considerable exothermic heat is potential, and in the absence of temperature control, especially if undiluted fluorine were employed, temperatures would rise relatively rapidly to a degree at which decomposition of sought-for oxygen difluoride would be excessive. While temperatures as high as about 150° C. may be employed, no particular advantages are afforded and higher reaction temperatures are not preferred. To promote good control and minimize $OF_2$ decomposition, maximum reaction temperature is preferably held not substantially above 125° C., temperature control being effected preferably by fluorine gas dilution although other suitable control means may be employed if desired. To facilitate prompt start of reaction in the reaction zone, it is preferred to maintain the latter at a temperature not below about 40° C. In situations where, in the interest of fluorine handling and smoothness of reaction, high dilution of fluorine with inert gas may be desired, thus correspondingly reducing reaction zone temperatures normally developed by exothermic heat, extraneous heat may be applied to the reaction zone. For best operation, reaction zone temperatures are preferably maintained in the range of 40°–125° C. regardless of whatever kind of temperature control may be utilized, and moreover, to facilitate smoothness of reaction, it is preferred, as in the appended examples, to proceed so that in the reaction zone fluorine is present in amount less than one mol proportion per mol of superoxide.

Although as demonstrated in the appended examples the fluorine-superoxide reaction may be carried out in the absence of a catalyst, it has been found that the presence of a relatively small amount of an oxide of silver substantially promotes thoroughness of reaction. The oxides of silver which may be used include silver monoxide, AgO, and silver oxide, $Ag_2O$. The amount of silver oxide does not generally exceed about 1%, based on the weight of the superoxide starting material. Preferably, the amount of oxide of silver employed does not exceed about 0.5% by weight, based on the quantity of the superoxide present. Amounts of oxide of silver as small as about 0.1% and as little as about 0.0005% by weight may be used. In practice, whatever oxide of silver is used may be dispersed relatively uniformly throughout the superoxide, normally in powder form, prior to charging the latter into the reaction zone.

Recovery of sought-for oxygen difluoride from the reactor exit may be effected by means more or less conventional in this art, e.g. by a cold trap as previously described. The oxygen difluoride condensate collecting in the cold trap, maintained at about minus 150°–160° C., may contain small amounts of impurities, such as oxygen, $SiF_4$ and $CF_4$. In the following examples, the presence of small amounts of $SiF_4$ appears to be attributable to minor reaction between elemental fluorine and the glass of the reactor, and it is believed that the small quantity of $CF_4$ was present as an impurity in the elemental fluorine charged to process. In practice, if desired impurities may be separated from the $OF_2$ by conventional fractionation.

The following examples delineate illustrative embodiments of the invention process.

EXAMPLE 1

About 10 grams of $KO_2$ in yellow powder form were charged into a tubular glass reactor about 12 in. long and about 1.5 in. I.D. The $KO_2$ contained, dispersed throughout, about 0.1% of silver monoxide, AgO, based on the weight of the $KO_2$. A gaseoux mixture, consisting of fluorine diluted with about 2 parts by volume of nitrogen, was passed into the inlet end of the reactor. At the beginning of the run, the reactor and contents, and the fluorine-nitrogen feed gas were at about room temperature. Feed of the fluorine-nitrogen mixture to the reactor was continued for about 1.5 hrs. during which time temperature in the reactor, because of the exothermic nature of the reaction, increased to about 80°–90° C. at the end of the run. The yellow color characteristic of the material in the reactor changed to white as reaction proceeded. The exit gas of the reactor was run into a trap cooled to temperature in the range of $-150°$–$-160°$ C. by means of a $CCl_2F_2$-nitrogen slush bath. At the end of the run, the condensate in the trap was warmed up sufficiently to vaporize all of the liquid contents. Infrared analysis of the resulting vapors showed the product to be $OF_2$ plus small trace quantities of $CF_4$ and $SiF_4$.

EXAMPLE 2

Apparatus-wise and in general procedure, this run was substantially the same as in Example 1. About 14 g. of $KO_2$ were charged into the reactor, and no oxide of silver catalyst was employed. At the start of the run, of a total duration of about 2.5 hrs., the gas mixture fed to the reactor was the same as in Example 1. Shortly after start of the run, fluorine concentration in the feed gas was increased to about 4 fluorine to one nitrogen by volume. Rate of reaction was notably lower, and less heat was generated than in the procedure of Example 1. Temperature rose to about 35° C. exothermically prior to application of extraneous heat. Temperatures for the most part of and at the end of the run, generated by both the exothermic heat and the added extraneous heat, were in the range of 60°–70° C. As in Example 1, the yellow color of the material in the reactor changed to white as reaction proceeded. The exit gas of the reactor was handled as in Example 1. Such condensate was all vaporized out of the cold trap, and infrared analysis of the resulting vapors showed product to be $OF_2$ plus small to trace quantities of $CF_4$ and $SiF_4$.

EXAMPLE 3

About 10 grams of $KO_2$ containing about 0.0007% of dispersed silver oxide, $Ag_2O$, based on the weight of the $KO_2$, were charged into the reactor of Example 1. The diluent used was helium. A gaseous mixture, consisting of fluorine diluted with about an equal volume of helium was passed into the inlet end of the reactor. At the beginning of the run, the reactor and contents, and the fluorine-helium gas were at about room temperature. Feed of the gas mixture to the reactor was continued for about 2 hrs., during which time temperature in the reactor rose exothermically to about 110° C. Reaction proceeded smoothly and rapidly, and the yellow color of the material in the reactor changed to white as reaction proceeded. Exit gas of the reactor was handled as in Example 1. The condensate was totally vaporized by sufficient warming of the cold trap, and infrared analysis of the resulting vapors showed the product to be $OF_2$ and small to trace quantities of $CF_4$ and $SiF_4$.

We claim:

1. The process for making oxygen difluoride which comprises subjecting alkali metal dioxide in a reaction zone, at temperature substantially in the range of 20°–150° C., to the action of elemental fluorine to effect reaction of fluorine with the alkali metal dioxide to form oxygen difluoride, and recovering oxygen difluoride.

2. The process of claim 1 in which temperature is substantially in the range of 40°–125° C.

3. The process of claim 1 in which the alkali metal is potassium.

4. The process of claim 1 in which in the reaction zone fluorine is present in amount less than one mol proportion per mol of alkali metal dioxide.

5. The process for making oxygen difluoride which comprises subjecting alkali metal dioxide in a reaction zone, at temperature substantially in the range of 20°–150° C. and while in the presence of a small amount of oxide of silver, to the action of elemental fluorine to effect reaction of the fluorine with the alkali metal dioxide to form oxygen difluoride, and recovering oxygen difluoride.

6. The process of claim 5 in which the oxide of silver is present in amount not greater than about 1% by weight, based on the weight of the weight of the alkali metal dioxide.

7. The process for making oxygen difluoride which comprises subjecting potassium dixoide in a reaction zone, at temperature substantially in the range of 40°–125° C. to the action of elemental fluorine and while in the presence of oxide of silver in amount not greater than about 0.5% by weight, based on the weight of the potassium dioxide, and recovering oxygen difluoride.

8. The process of claim 7 in which fluorine is charged as a constituent of a gas containing by volume 20–40% elemental fluorine and 80–60% inert diluent gas.

* * * * *